United States Patent [19] [11] Patent Number: 4,658,292
Okamoto et al. [45] Date of Patent: Apr. 14, 1987

[54] ENCIPHERING KEY DISTRIBUTION SYSTEM FOR SUBSCRIPTION TV BROADCAST OR CATV SYSTEM

[75] Inventors: Eiji Okamoto; Katsuhiro Nakamura, both of Tokyo, Japan

[73] Assignee: NEC Corporation, Japan

[21] Appl. No.: 489,243

[22] Filed: Apr. 27, 1983658292031003380 21

[51] Int. Cl.⁴ .................. H04N 7/167; H04L 9/00
[52] U.S. Cl. .............................. 380/20; 380/21; 380/23; 380/28
[58] Field of Search .......... 178/22.13, 22.14, 22.15, 178/22.16, 22.08, 22.09, 22.18, 22.19; 358/114, 122, 123, 124

[56] References Cited

U.S. PATENT DOCUMENTS

| 4,078,152 | 3/1978 | Tuckerman | 178/22.09 |
| 4,323,921 | 4/1982 | Guillou | 358/114 |
| 4,411,017 | 10/1983 | Talbot | 178/22.16 |
| 4,484,027 | 11/1984 | Lee et al. | 178/22.13 |
| 4,531,020 | 7/1985 | Wechselberger et al. | 358/122 |

OTHER PUBLICATIONS

Error–Correcting Codes, By: W. Wesley Peterson and E. J. Weldon, Jr., The MIT Press, pp. 170–179, Copyright 1972.

Primary Examiner—Stephen C. Buczinski
Assistant Examiner—Melissa L. Koltak
Attorney, Agent, or Firm—Laff, Whitesel, Conte & Saret

[57] ABSTRACT

An enciphering key distribution system comprises a transmitter having an address generator for generating the addresses of those subscribers to which a first enciphered TV signal is to be distributed. An enciphering generator generates a second enciphering, in response to the individual addresses, on a one-to-one correspondence with the individual subscribers. A multiplier produces a product which is associated with all the subscribers. An adder adds the first enciphered signal to the product. The system also comprises a receiver having a divider for dividing the signal transmitted from the transmitter by one of the second encipherings on a basis which is assigned to the particular subscriber or receiver.

10 Claims, 6 Drawing Figures

ENCIPHERING KEY DISTRIBUTION SYSTEM FOR SUBSCRIPTION TV BROADCAST OR CATV SYSTEM

The present invention relates to an enciphering key signal distribution system for use with a subscription television broadcast or cable television system.

In a subscription TV system, the TV broadcaster transmits enciphered TV signals while subscribers or receivers decipher the incoming signals into the original TV signals. The requisite in this system is that the broadcaster supplies each subscriber with a key signal which has to be used for enciphering the TV signal. A conventional key signal distribution system for fulfilling the requisite is disclosed in U.K. Patent Application GB No. 2,079,109A, published Jan. 13, 1982 (corresponding to U.S. patent application Ser. No. 160,985). The drawback inherent in this prior art system is that, because the enciphering key signal is distributed to each subscriber together with an address particular to the subscriber, every subscriber or receiver has to be furnished with data selectors (42, 44) for finding out its subscriber address. As a result, the structure of the receiver becomes complicated.

An object of the present invention is to provide a key signal distribution system of simple structure.

An enciphering key signal distribution system of the invention comprises a transmitter having address generator means for generating addresses of subscribers to which a first enciphering key signal for enciphering a TV signal is to be distributed. An enciphering key signal generator means generates second enciphering key signals in response to the individual addresses. The second enciphering key signals are assigned on a one-to-one correspondence to the individual subscribers. Multiplier means produces a product of the second key signals associated with all the subscribers, and adder means adds the first key signal to the product of the second key signals. The system also comprises a receiver having a divider for dividing the signal transmitted from the transmitter by one of the second enciphering key signals which is assigned to the particular subscriber or receiver.

The present invention will be described in detail with reference to the accompanying drawings in which.

In the drawings, the same reference numerals designate the same structural elements.

Figure 1:
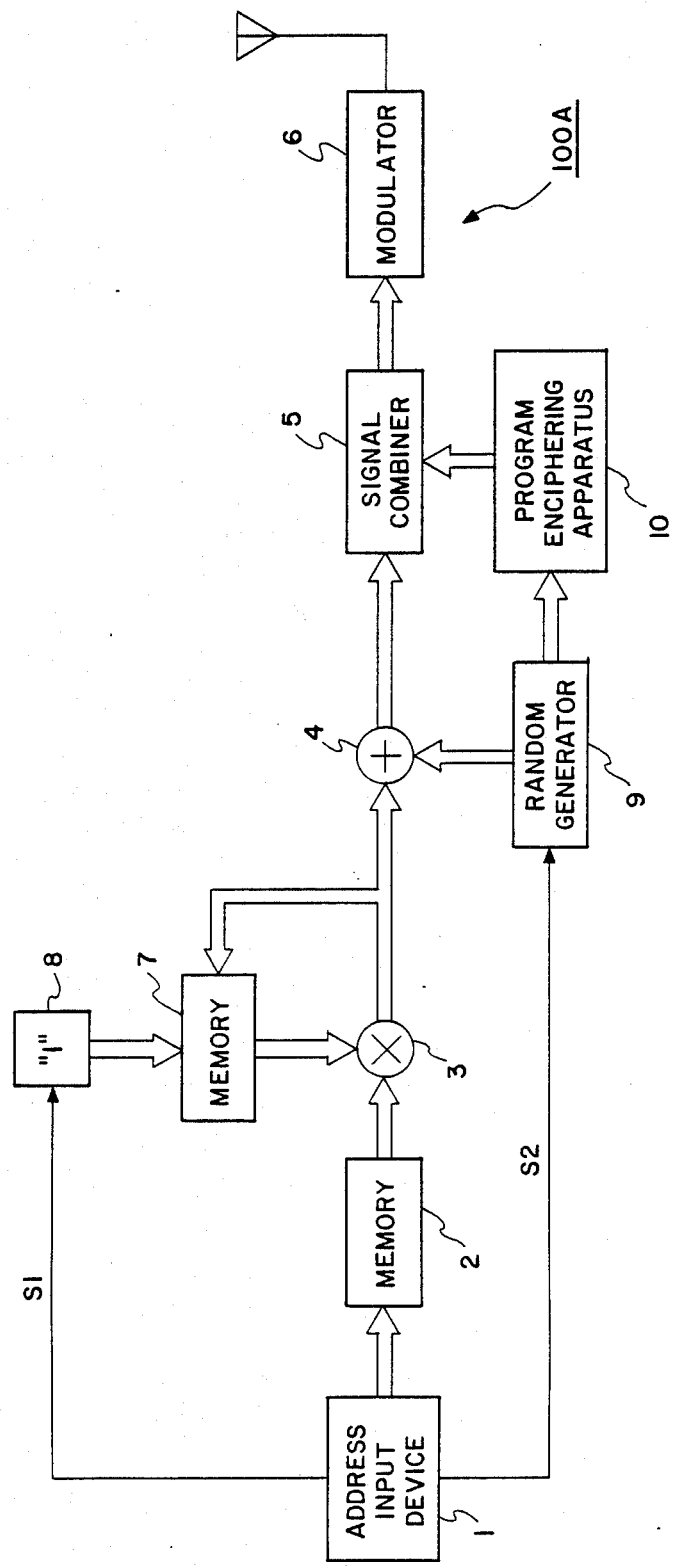
FIGS. 1 and 2 are block diagrams respectively showing a transmitter and a receiver for the first embodiment of the present invention.

Referring to FIG. 1, a transmitter 100A, for use in the first embodiment of the invention, is illustrated in block form. The transmitter 100A includes an address input device 1 which may be made up of an address generator (not shown) and a control circuit (not shown). The address generator generates addresses of subscribers, the addresses to be supplied with an enciphering key signals. The control circuit produces control signals S1 and S2 which are indicative of the start and end of the addresses, respectively.

The subscriber addresses are fed from the address input device 1 to a memory 2 which stores prime numbers (second keys) on a one-to-one correspondence with the subscriber addresses. The control signal S1 is fed to an initial value store circuit 8 which, in response thereto, supplies a signal "1" to a memory 7. A multiplier 3 multiplies the prime number from the memory 2 by the signal "1" from the memory 7, and the resulting product is delivered to the memory 7 and an adder 4. The multiplier 3 multiplies the content then stored in the memory 7 by the prime number of the next subscriber address supplied from the memory 2, the product being sent to the memory 7. In this manner, the multiplier 3 produces a product P of prime numbers $P_1$ to $P_N$ of all the subscriber addresses (N), $P = P_1 \times P_2 \times P_3 \ldots \times P_N$.

A random number generator 9 responds to the control signal S2 from the address input device 1 to supply the adder 4 with an enciphering key signal K (first key). The adder 4 adds the first key signal K to the product P of the prime numbers and delivers the sum A as a key signal to a signal combiner 5. The first key signal K from the random number generator 9 is also fed to a TV signal or program enciphering apparatus 10 for encrypting a TV signal. The signal combiner 5 combines an enciphered TV signal X and the enciphering key signal A. The combined signal is fed to a modulator 6 to transmit the resulting modulation in a form which is appropriate for the particular medium, whether it be broadcast, cable or satellite. In this embodiment, the form of the signal is applicable to satellite communications, by way of example.

Figure 2:
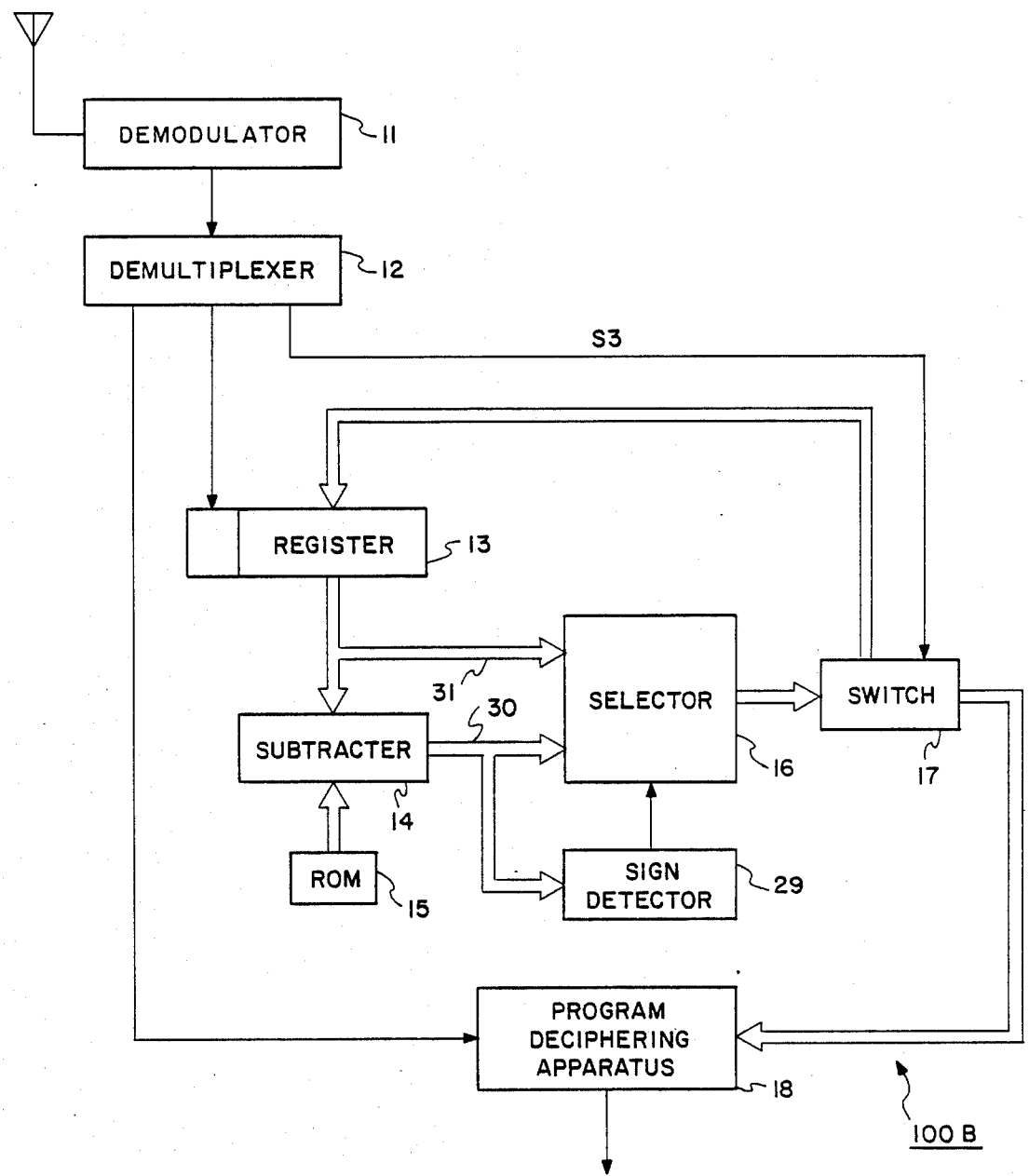

Referring to FIG. 2, a receiver 100B, associated with the transmitter shown in FIG. 1, is illustrated. As previously stated, the key signal A coming into the receiver 100B is the sum of the key signal K and the product P of all the prime numbers assigned to authorize receivers and is expressed as:

$$A = P_1 . P_2 \ldots P_N + K \quad (1)$$

It will be seen from the equation (1) that if a receiver is one of those which is authorized and if its prime number $P_e$ is one of the assigned $P_1$ to $P_N$, a selection of a value smaller than the prime numbers $P_1$ to $P_N$ for the key signal K will give the key K as a residue when the key signal A is divided by the prime number $P_e$:

$$A(\bmod P_e) = K \quad (2)$$

The receiver 100B shown in FIG. 2 provides the key K by using the equation (2).

As shown in FIG. 2, the receiver 100B includes a demodulator 11 for demodulating the signal communicated thereto from the transmitter 100A (FIG. 1). The output of the demodulator 11 is fed to a demultiplexer 12 to be separated into the key signal $A = P + K = (a_0 \, a_1 \, a_2 \ldots a_m)$ and the enciphered TV signal X. The key signal A is fed, bit by bit, to the least significant $a_0$ bit (LSB) of a register 13. The other bits stored in the register 13 are supplied, together without outputs of a selector 16, via a switch 17, although their initial values are commonly "0".

A subtractor 14 provides a signal representing the difference between the output $a_0$ of the register 13 and a prime number $P_e = (b_0 \, b_1 \ldots b_j)$ assigned to the receiver, the prime number being supplied from a ROM 15. A sign detector 29 detects a sign of the difference of the subtractor 14 and delivers a detection signal as a select signal to the selector 16. Supposing that the prime number $P_e$ is not zero, it is larger than the register output $a_0$ so that the detector 29 supplies a "1" to the selector 16 to indicate a negative.

The selector 16 is constructed to select a signal line 31 when the sign is negative and a signal line 30 when it is not negative. Therefore, in response to the "1" output, the selector 16 selects the signal line 31 ($a_0$). At the next timing, the subtractor 14 is supplied with an integer ($a_0a_1$) which consists of the $a_1$ bit fed to the LSB memory of the register 13. The $a_0$ bit is supplied through the switch 17. Subtracting the prime number $P_e$ from integer ($a_0a_1$), the subtractor 14 supplies the selector 16 with ($a_0a_1$)$-P_e$. The selector 16 supplies the register 13 with ($a_0a_1$), if it is smaller than $P_e$, and with ($a_0a_1$)$-P_e$ if otherwise. Stated another way, the register 13 stores a residual of the division of ($a_0a_1$) by $P_e$, ($a_0a_1$) (mod $P_e$). As the key signal is stored up to the most significant bit (MSB) $a_m$ in the register 13, the register 13 stores A(mod $P_e$).

When the demultiplexer 12 delivers to the switch 17 a control signal S3 indicating the detection of the MSB $a_m$ of the key signal, the switch 17 supplies the TV signal deciphering apparatus 18 with the output A(mod $P_e$) of the selector 16, as the key signal K. Then the apparatus 18, using the key signal K, deciphers the enciphered TV signal X into the original TV signal.

Figure 3:
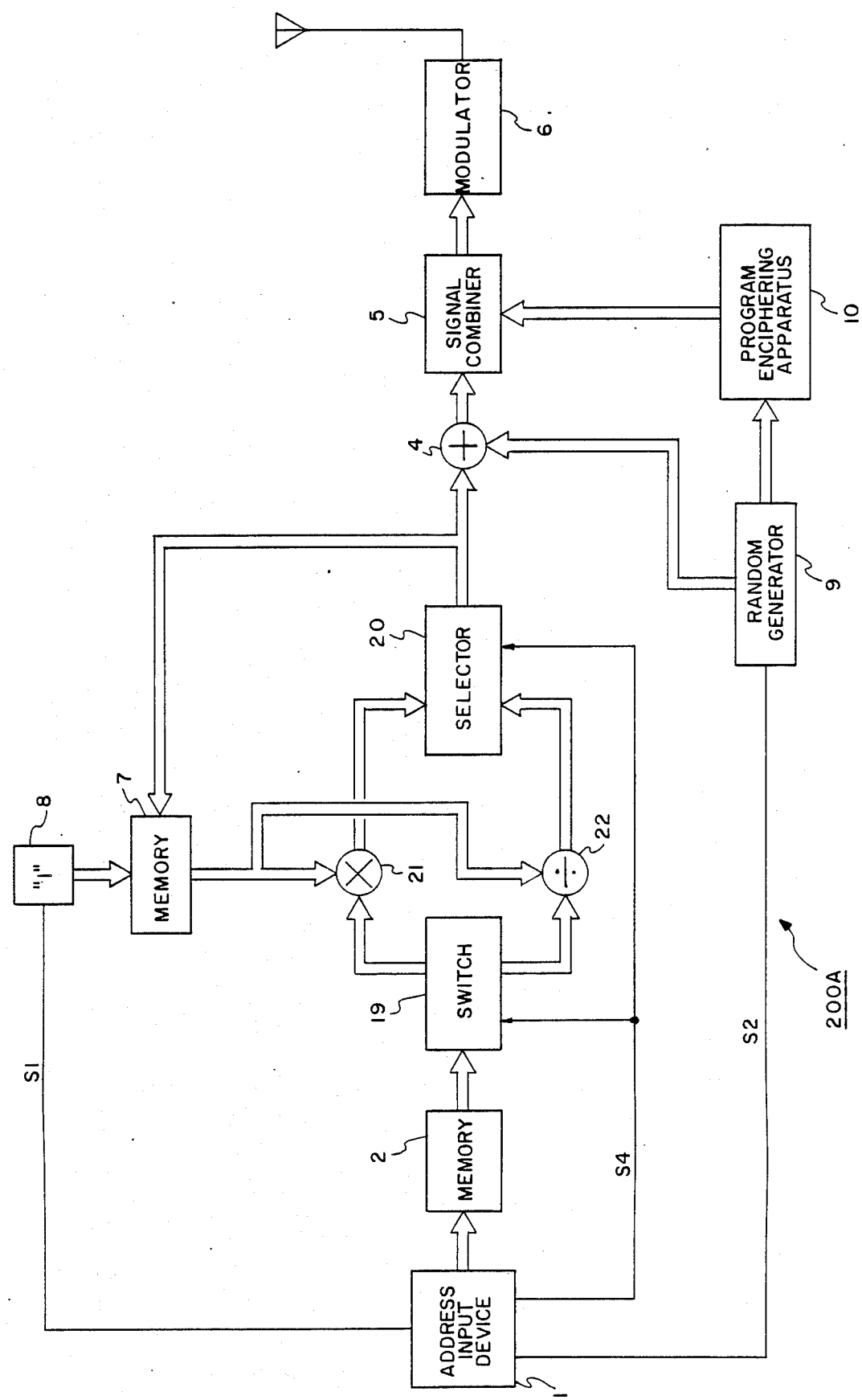
FIGS. 3 and 4 are block diagrams respectively showing a transmitter for the second and third embodiments of the present invention.

Referring to FIG. 3, a transmitter 200A for the second embodiment of the invention is suitable for a distribution of a new key number NK, upon the entry of a new subscriber into the system or a withdrawal of an old subscriber from the system.

In the transmitter 200A, the address input device 1 generates addresses of receivers to which a key signal is to be newly distributed and the addresses of receivers to which the key signal distribution is to be stopped. The output of the address input device 1 is fed to the memory 2. Also the address input device 1 generates the start signal S1, the end signal S2, and an address indication signal S4 which is indicative of either the entered address or the withdrawn address. The prime numbers corresponding to the subscriber addresses read out of the memory 2 are delivered to a multiplier 21 or a divider 22 in response to an "0" level of the control signal S4.

The multiplier 21 multiplies the product of prime numbers ($P=P_1 \times P_2 \times \ldots P_N$) which are supplied from the memory 7 and the prime number $P_0$ of the new subscriber. A selector 20 selects the output of the multiplier 21, in response to the control signal S4, and supplies that output to the memory 7. After obtaining the product $P \times P_0$, a switch 19 responds to a "1" level of the control signal S4 to supply the divider 22 with a prime number of the withdrawn subscriber, the prime number being given from the memory 2, e.g. $P_1$.

The divider 22 divides the output ($P_0 \times P$) of the memory 7 by $P_1$ and give the selector 20 the result ($P_0 \times P/P_1$). In this manner, the product of prime numbers of all of the subscribers is obtained after there has been a change in subscriber. Thereafter, the transmitter 200A operates in the manner described, in connection with the transmitter of FIG. 1, in adding the enciphering key signal NK and transmitting it to the subscribers. The key signal NK sent from the transmitter 200A of FIG. 3 will be deciphered by the receiver 100B of FIG. 2.

While the first and second embodiments have concentrated on prime numbers which are assigned to individual subscribers, they may be replaced by coefficients of irreducible polynominals.

Figure 4:
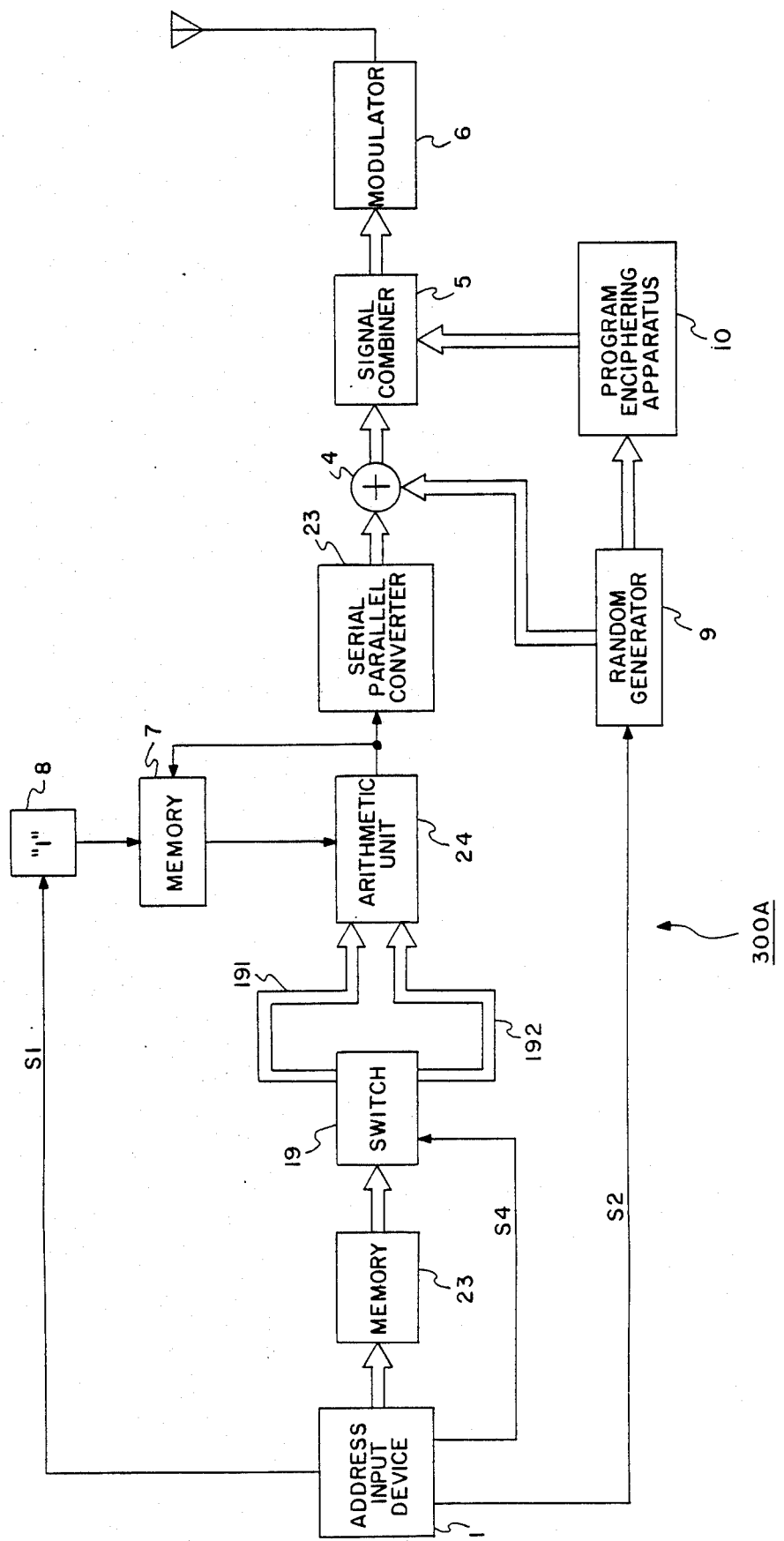

Referring to FIG. 4, a transmitter 300A is shown for a third embodiment of the invention. Transmitter 300A is designed to allocate coefficients of irreducible polynominals to identify individual subscribers.

The address input device 1 generates addresses of subscribers and supplies them to a memory 23, which has stored the coefficient pattern of polynominals assigned to identify the individual subscribers. Supposing the sixth order polynominals are used and the polynominal $Z=X^6+X^5+X^4+X^3+1$ is assigned to the N-th subscriber, the memory 23 has in its location the coefficient pattern (1111001) which consists of the coefficient of the respective terms of the polynominal Z. In response to the control signal S4 from the address input device 1, the switch 19 is actuated to pass therethrough the coefficient pattern from the memory 23 to an arithmetic unit 24 whose function is equivalent to the functions of the multiplier 21 and divider 22 shown in FIG. 3. The output of the arithmetic unit 24 is converted by a serial-to-parallel converter 23 into a parallel signal which is then fed to the adder 4. The random number generator 9, signal combiner 5, TV signal enciphering apparatus 10 and modulator 6 are the same as the corresponding circuits shown in FIG. 3 and, therefore, will not be described any further herein. It is noted that the adder comprises exclusive OR gates, on a one-to-one correspondence with the coefficients.

Figure 5:
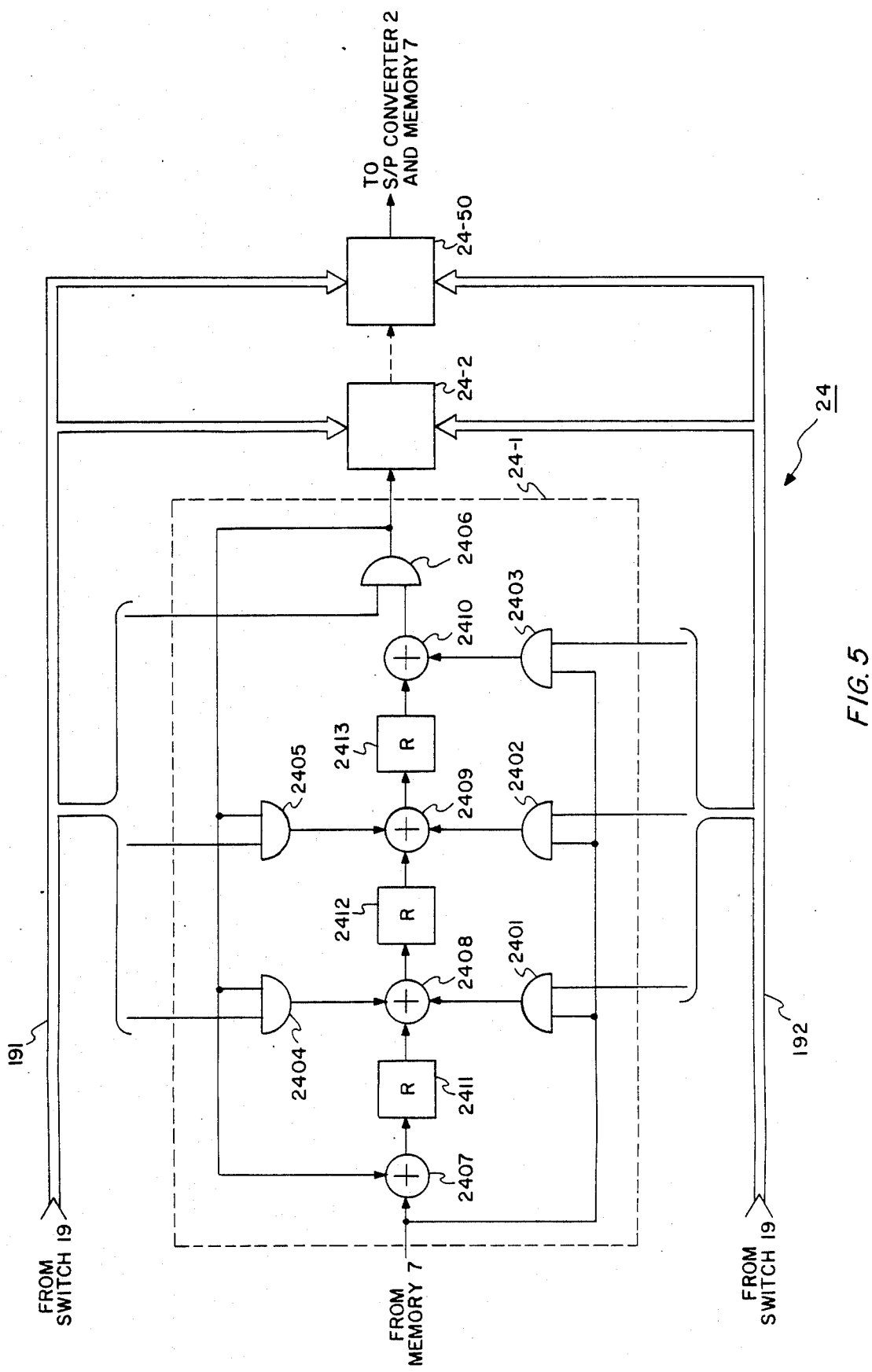
FIG. 5 is a circuit diagram showing a part of the transmitter of the third embodiment.

As shown in FIG. 5, the arithmetic unit 24, for example, comprises fifty multiplier/dividers 24-1 to 24-50 which are connected in series with each other and which are constructed in an identical manner. The multiplier/divider 24-1, for example, comprises AND gates 2401-2403 for performing switching operations in response to a polynominal coefficient pattern of a newly entered subscriber number. The coefficient pattern is supplied from the switch 19 via a signal line 192. The AND gates 2404-2406 perform a switching operation in response to a polynominal coefficient pattern of a withdrawn subscriber, which is supplied via a signal line 191. The delay circuits 2411-2413 delay the signal from the memory 7 by one bit. The exclusive OR (EX-OR) gates 2407-2410 provide an exclusive OR logic function. The EX-OR gates 2407-2410, delay circuits 2411-2413 and AND gates 2401-2403 cooperate to multiply the signal from the memory 7 by the polynominal coefficient pattern which identifies a new subscriber. Meanwhile, the EX-OR gates 2407-2410, delay circuits 2411-2413 and AND gates 2404-2406 cooperate to divide the signal from the memory 7 by the polynominal coefficient pattern of a withdrawn subscriber. For details of the multiplier/divider 24-1, reference is made to W. Welsley Peterson et al. "Error-Correction Codes", pp. 171-179, THE MIT PRESS, 1961.

Figure 6:
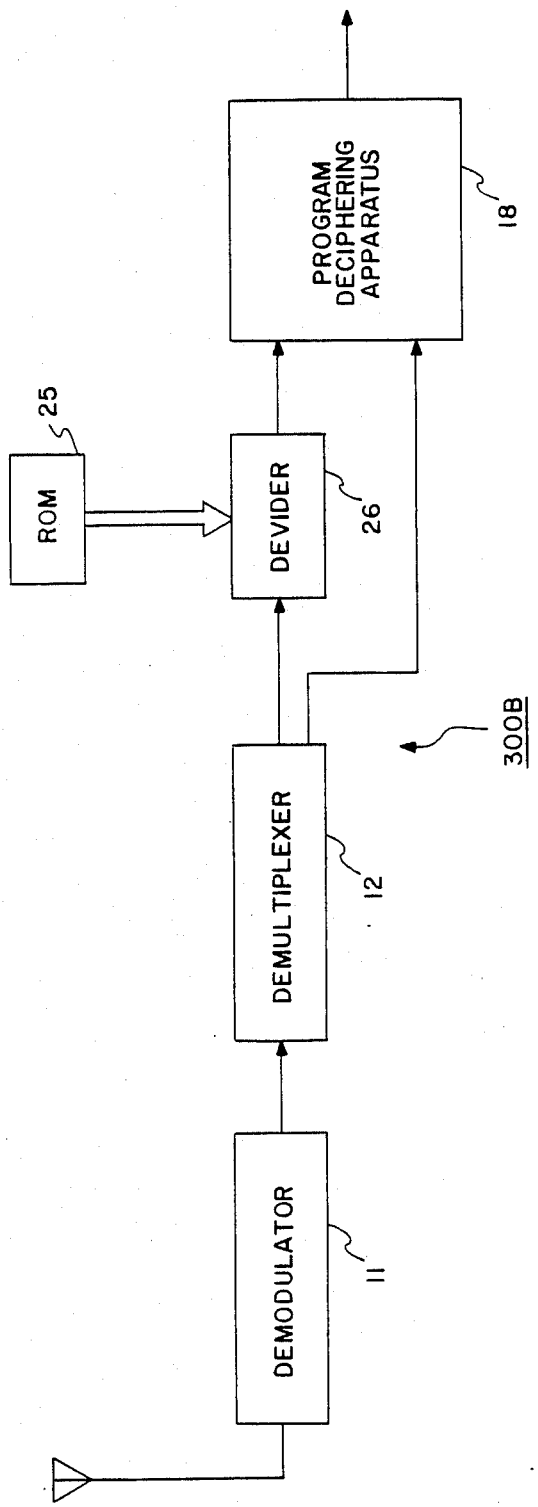
FIG. 6 is a block diagram of a receiver for the third embodiment.

Referring to FIG. 6, a receiver 300B is shown for the third embodiment of the present invention. The receiver 300B comprises the demodulator 11 for demodulating the signal transmitted from the transmitter 300A shown in FIG. 4, and the demultiplexer 12 for dividing the demodulated signal into the key signal A and the enciphered TV signal. Also installed in the receiver 300B is a divider 26 for obtaining the key signal by dividing the enciphering key signal by the subcriber's coefficient pattern, given from a ROM 25. The deciphering apparatus 18 deciphers the enciphered TV signal from the demultiplexer 12, responsive to a use of the key signal. The divider 26 may comprise the divider section (EX-OR 2407-2410, delay circuits 2411-2513 and gates 2404-2406) of the multiplier/divider 24-1 shown in FIG. 5. Then, the gates 2404-2406 will be supplied with the subscriber's coefficient pattern from the ROM 25.

In summary, it will be seen that an enciphering key signal distribution system of the present invention picks up a TV signal enciphering key by dividing a transmitted signal by a key signal which identifies a particular subscriber and, thereby, simplifies a receiver construction.

What is claimed is:

1. An enciphering key signal distribution system comprising:
   transmitter means having first enciphering key signal generator means for generating a first key enciphering signal which is used for enciphering a TV signal, address generating means for generating addresses of subscribers, second enciphering key signal generator means for generating second enciphering key signals in response to said addresses, said second enciphering key signals being assigned on a one-to-one correspondence with said subscribers, multiplier means for producing a product of the second key signals associated with all of said subscribers, and adder means responsive to a signal supplied from said address generating means which is indicative of the last address of said subscribers for adding said first key signal to said product of said second key signals;
   means for transmitting a signal responsive to the output of said adder means; and
   receiver means having a divider means for dividing the signal transmitted from said transmitter means by one of said second enciphering key signals which is assigned to identify the particular subscriber who is receiving the signal.

2. An enciphering key signal transmitter comprising:
   address generator means for generating addresses of subscribers to which a first enciphering key signal for enciphering a TV signal is to be distributed;
   enciphering key signal generator means for generating second enciphering key signals in response to said addresses, said second enciphering key signals being assigned on a one-to-one correspondence with said subscribers;
   multiplier means for producing a product of said second key signals associated with all said subscribers; and adder means for adding said first key signal to said product of second key signal.

3. The enciphering key distribution system as claimed in claim 1, in which said second enciphering keys comprise prime numbers.

4. The enciphering key distribution system as claimed in claim 1, in which said first and second enciphering keys comprise polynominal coefficients.

5. An enciphering key receiver comprising:
   demodulator means for demodulating a signal transmitted from a transmitter;
   means for separating said demodulated signal into a key signal including a first key and a control signal;
   register means for sequentially receiving said key signal bit by bit;
   means for storing a second key assigned to said receiver;
   subtractor means for producing a difference between an output of said register means and said second key supplied from a key storage means;
   a selector for selecting said difference when the difference is nonnegative and selecting said second key when the difference is negative; and
   means for picking up an output of said selector as said first key in response to said control signal.

6. A process for enabling the distribution of subscription television signals, said process comprising the steps of:
   (a) transmitting TV signals from a station having the addresses of all subscribers stored therein;
   (b) generating enciphered key signals corresponding to individually associated subscriber addresses on a one-for-one basis;
   (c) producing a product of all of said enciphered key signals;
   (d) generating a key signal for enciphering said TV signals;
   (e) adding the key signals generated in steps (c) and (d);
   (f) transmitting the signal combined in step (e) along with said television signals; and
   (g) receiving and dividing the signal transmitted in step (f) by the key signal which individually corresponds to the individual subscriber who is receiving the signal.

7. The process of claim 6 wherein each of said key signal of step (b) which corresponds with individual subscriber addresses is a prime number.

8. The process of claim 6 wherein said key signal representing all subscribers is a signal selected by a random number of generator.

9. The process of claim 7 wherein said key signal representing all subscribers is a signal selected by a random number of generator and the added step of enciphering said television signals responsive to said random number selected by said generator.

10. The process of claim 9 wherein said transmission of step (f) includes the added step of transmitting said signals by satellite directly to said subscriber.

* * * * *

UNITED STATES PATENT AND TRADEMARK OFFICE
CERTIFICATE OF CORRECTION

PATENT NO. : 4,658,292

DATED : April 14, 1987.

INVENTOR(S) : Eiji Okamoto; Katsuhiro Nakamura

It is certified that error appears in the above-identified patent and that said Letters Patent is hereby corrected as shown below:

The Filing Date should read --April 27, 1983--.

The foreign application priority data should read

--April 30, 1982 Japan 57-73143;
  April 30, 1982 Japan 57-73144; and
  May 12, 1982 Japan 57-79385.--

Signed and Sealed this

Second Day of February, 1988

Attest:

Attesting Officer

DONALD J. QUIGG

Commissioner of Patents and Trademarks